Sept. 15, 1942.  E. E. BROWN ET AL  2,296,141
SELECTIVE INDICATING AND DISPLAY DEVICE
Filed May 1, 1940  4 Sheets-Sheet 1

Inventors
Earl E. Brown
Ernest A. Anderson
William H. Schaper
By Williamson & Williamson
Attorneys Sept. 15, 1942. E. E. BROWN ET AL 2,296,141
SELECTIVE INDICATING AND DISPLAY DEVICE
Filed May 1, 1940 4 Sheets-Sheet 2
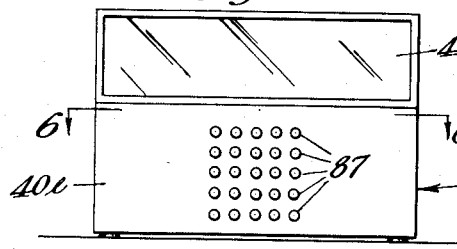
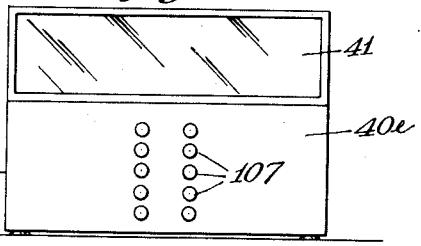
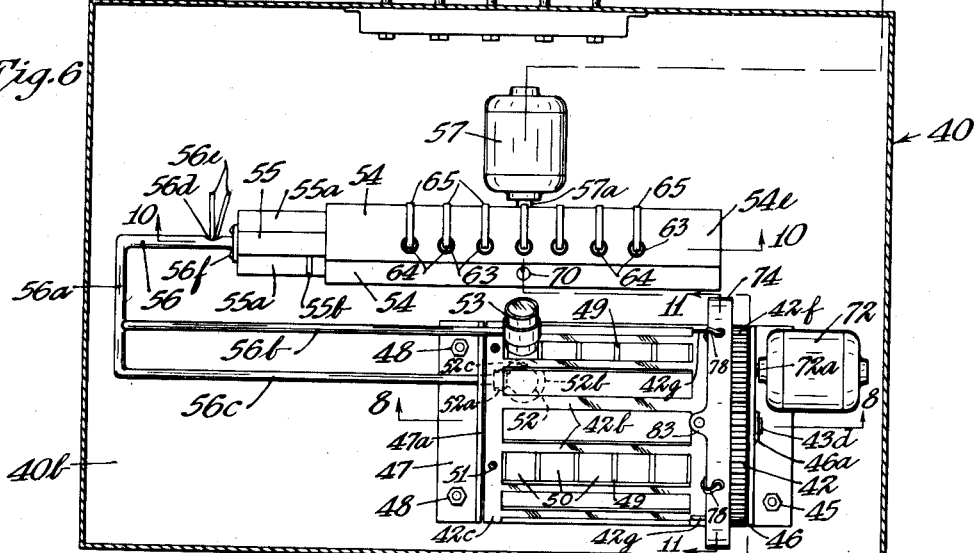
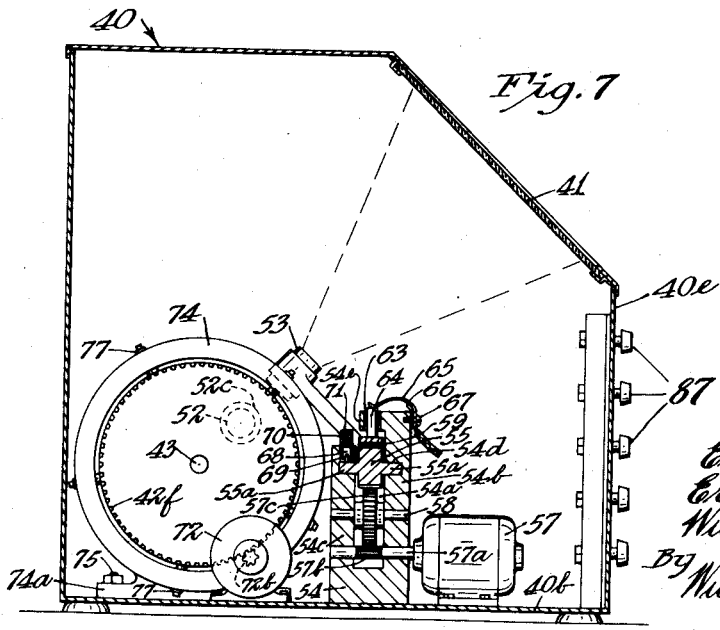
Inventors
Earl E. Brown
Ernest A. Anderson
William H. Schaper
By Williamson & Williamson
Attorneys.

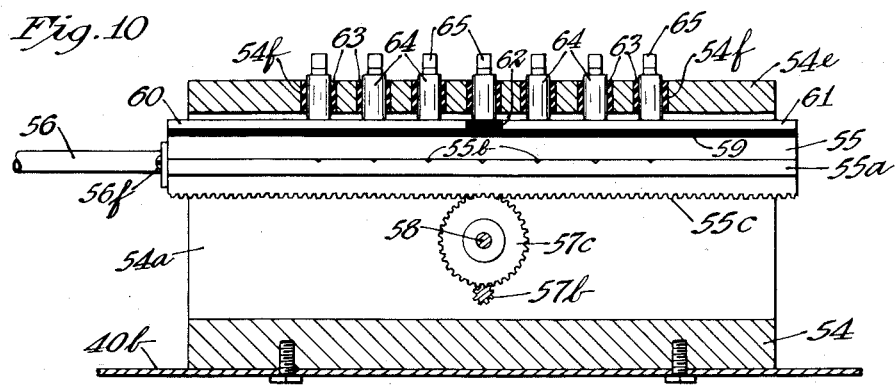
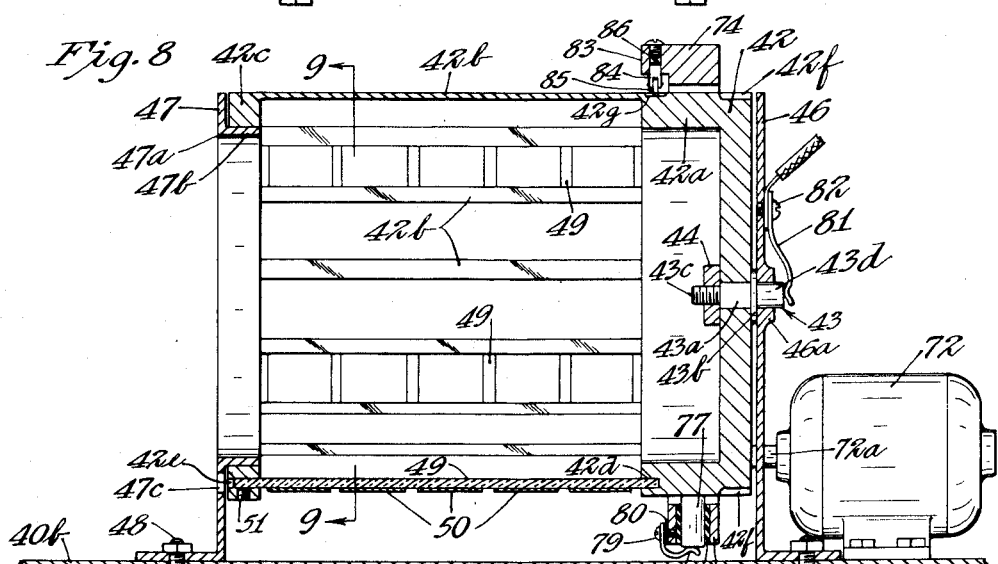
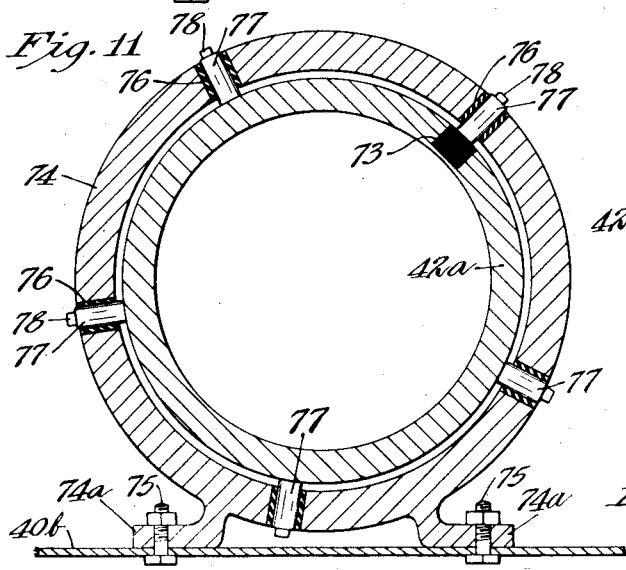

Sept. 15, 1942. E. E. BROWN ET AL 2,296,141
SELECTIVE INDICATING AND DISPLAY DEVICE
Filed May 1, 1940 4 Sheets-Sheet 4
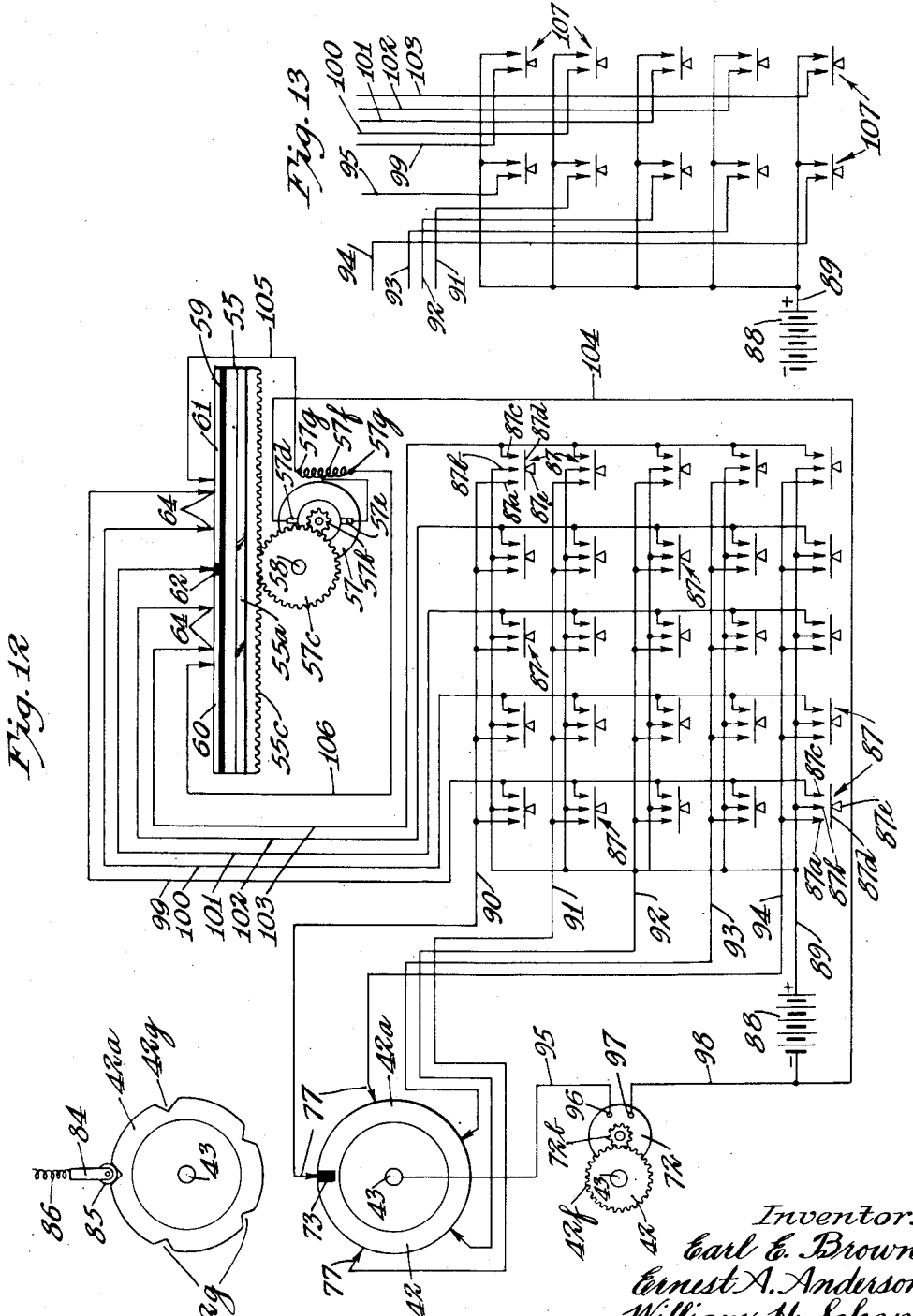

Patented Sept. 15, 1942

2,296,141

UNITED STATES PATENT OFFICE 2,296,141

SELECTIVE INDICATING AND DISPLAY DEVICE

Earl E. Brown and Ernest A. Anderson, Minneapolis, and William H. Schaper, Robbinsdale, Minn.

Application May 1, 1940, Serial No. 332,768

8 Claims. (Cl. 88—27)

Our invention relates to indicating and display apparatus and particularly to such apparatus for displaying a selected one of a plurality of displays.

It is necessary in many lines of business and other activities that participants search through various kinds of books containing schedules, time tables, catalog data and other types of information. In many instances such books have a relatively large number of pages and considerable time and energy is consumed in locating a particular page to which it is desired to refer.

It is a general object of our invention to provide apparatus for selectively displaying any one of a relatively large number of units or groups of informational data.

Another object is to provide such apparatus wherein individual units of information may be provided in miniature form and wherein a selected unit of information is magnified and projected upon a screen.

Still another object is to produce such apparatus which is selectively operable to bring about projection of any desired one of a plurality of informational displays upon the screen.

Yet another object is to provide such apparatus wherein the units of informational data are disposed on a generally cylindrical rotatable member in a circumferentially extending series of axially extending rows of informational units.

Still another object is to provide such apparatus wherein optical equipment constituting projection means is provided and is adjustively shiftable longitudinally of the cylindrical member for alignment with any selected circumferentially extending row of informational units and wherein the cylindrical member is adjustively rotatable for aligning any selected axial row of informational units with the projection means.

Yet another object is to provide such apparatus including electrically operated automatic position seeking equipment for adjustively rotating the cylindrical member and adjustively shifting the projection means responsive to manipulation of electrical control elements such as push buttons or the like.

A further object is to provide such apparatus wherein the units of informational data may be readily replaced by new units.

A still further object is to provide such apparatus of simple, light, compact, reliable, easily operable, and inexpensive construction.

These and other objects and advantages of the invention will more fully appear from the following description made in connection with the accompanying drawings, wherein like reference characters refer to the same parts throughout the views, and, in which:

Fig. 4 is a front view of another form of our device having automatic electrical control;

Fig. 5 is a front view of a modification of the embodiment shown in Fig. 4;

Fig. 6 is a section taken on the line 6—6 of Fig. 4 showing the apparatus contained within the devices of Figs. 4 and 5;

Fig. 7 is a vertical sectional view taken approximately on the line 7—7 of Fig. 6, as indicated by the arrows;

Fig. 8 is a vertical sectional view taken on the line 8—8 of Fig. 6, as indicated by the arrows;

Fig. 9 is a sectional view taken on the line 9—9 of Fig. 8, as indicated by the arrows;

Fig. 10 is a sectional view taken on the line 10—10 of Fig. 6, as indicated by the arrows;

Fig. 11 is a sectional view taken on the line 11—11 of Fig. 6, as indicated by the arrows;

Fig. 12 is an electrical connection diagram for the apparatus shown in Fig. 4 and Figs. 6 to 11 inclusive with certain mechanical parts of the apparatus shown diagrammatically; and Fig. 13 is a modification of a portion of the connection diagram of Fig. 12 applicable to the apparatus of Figs. 3 to 11 inclusive arranged in accordance with Fig. 5.

Figure 1:
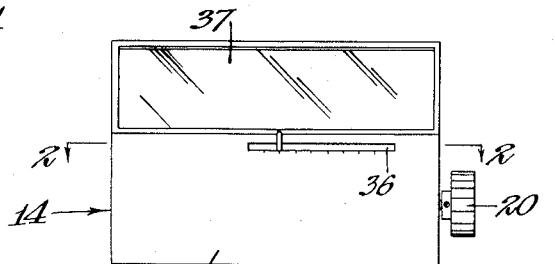
Fig. 1 is a front view of an embodiment of our invention.
Figure 2:
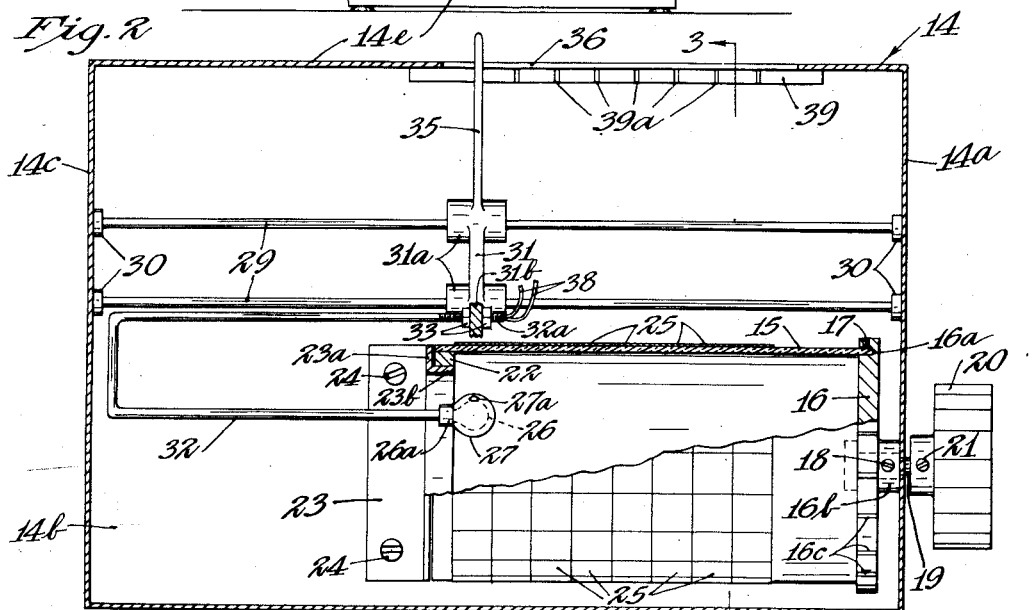
Fig. 2 is a horizontal sectional view taken on the line 2—2 of Fig. 1, as indicated by the arrows.
Figure 3:
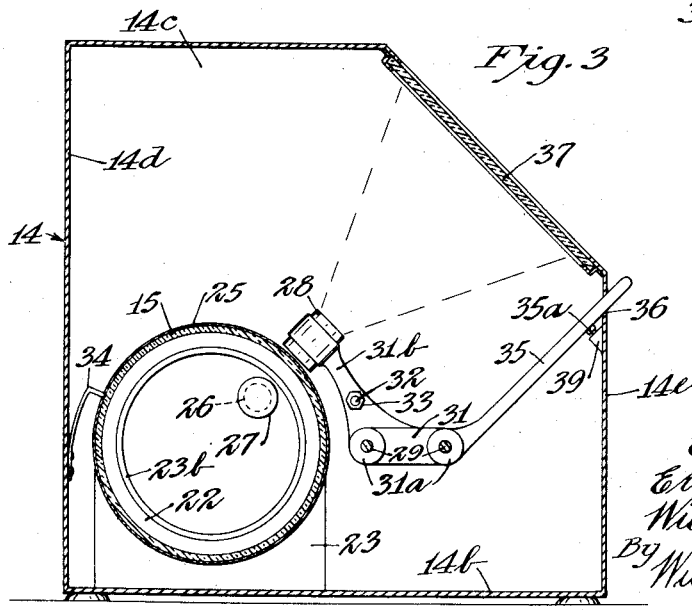
Fig. 3 is a vertical sectional view taken on the line 3—3 of Fig. 2, as indicated by the arrows.

Referring to the drawings and particularly to Figs. 1 to 3 inclusive thereof we show a manually operable form of our selective indicating and display device built into a cabinet or casing 14. Toward the rear of the cabinet 14 we provide therewithin a generally cylindrical member including a tubular element 15 formed of glass, transparent plastic material or other suitable transparent material. At one end thereof the tubular element 15 is projected into a suitable axially facing annular groove 16a in a wheel or face plate 16 and is secured in the groove by suitable means such as set screws 17. The wheel 16 has a hub 16b secured by suitable means such as the set screw 18 on a shaft 19 which projects outwardly through a suitably apertured portion of the right-hand wall 14a of the cabinet 14 and carries on its outer end a knob 20 secured on the shaft 19 by means such as the set screw 21. The remaining end of the tubular element 15 is provided at its interior periphery with a ring 22 suitably secured therewithin. An annular guide 23a, comprising part of a bracket 23 which is secured to the floor 14b of the cabinet 14 by a suitable means such as the screws 24, includes a flange 23b which serves as a pivot on which the ring 22 may rotate.

A plurality of rectangular sheets of light transmissive material each bearing indicia produced thereon in miniature is arranged on the peripheral surface of the transparent tubular member 15 in a circumferentially extending series of axially extending rows. The respective sheets or units may consist of respective frames of film strips 25 which are similar to motion picture film and which are extended around and secured to the periphery of the tubular element 15 in side-by-side relation, as indicated in Fig. 2.

We provide within the interior space of the tubular member 15 a light source such as an electric light bulb 26 provided with a housing 27 having an aperture 27a in the outer side thereof through which the lamp 26 may project a beam of light radially outwardly of the tubular element 15 so that the beam of light thus produced will pass outwardly through the transparent element 15 and one frame or unit of the film strips 25 thereon. We provide a ray diverging lens unit 28 outwardly of the transparent element 15 and having its optical axis common with the axis of the beam of light projected by the light source 26.

Means is provided for supporting the light source 26 and the lens 28 and enabling adjustive movement of the same longitudinally of the tubular element 15 for alignment with any selected one of the several film strips 25. For this purpose we provide a pair of parallel rods 29 extending parallel to the axis of the tubular element 15 and supported at their ends in bosses 30 carried by the respective end walls 14a and 14c of the cabinet 14. We provide a body 31 having at respective portions thereof enlargements 31a which are suitably apertured and mounted in their apertured portions on the rods 29 for sliding movement longitudinally thereof. Carried on the body 31 is a bracket 31b on the upper end of which the lens unit 28 is rigidly mounted. A pipe 32 is bent into U-shape to form a bracket for supporting the lamp 26 and a socket 26a therefor. The socket 26a to which the lamp case 27 is attached is mounted on the free end of one of the legs of the U-shaped pipe 32. The pipe 32 may be utilized as a conduit for extension of wires 38 therethrough to supply electrical current to the lamp socket 26a. The remaining end of the pipe 32 is provided with screw threads 32a and is projected through an apertured portion of the bracket 31b as indicated in Figs. 2 and 3. Nuts 33 are placed on the screw threads 32a at respective sides of the bracket 31b and are drawn up to rigidly secure the pipe 32 to the bracket 31b. It should be apparent that movement of the body 31 longitudinally of the rods 29 will move the lamp 26 and the lens unit 28 in unison longitudinally of the tubular transparent element 15 so that the common axis of the lamp 26 and lens unit 28 may be aligned with any selected one of the film strips 25. When the lamp 26 and lens unit 28 have been aligned with a selected one of the film strips 25, the knob 20 may be rotated to adjustively position the transparent tubular element 15 so that a selected one of the frames of the selected film strip 25 may be brought into alignment with the common axis of the lamp 26 and the lens unit 28 so that an image of the indicia on the selected frame of the selected one of the film strips 25 will be projected outwardly and magnified by the lens unit 28. To assist in properly rotatably positioning the tubular element 15 the peripheral portion of the wheel 16 is provided with a series of notches 16c and a resilient dog element 34, which is best seen in Fig. 3, is attached to the rear wall 14d of the cabinet 14 to press against the periphery of the wheel 16 for cooperation with the notches 16c. The notches 16c are so located on the periphery of the wheel 16 that the dog 34 will be engaged in one thereof when any selected frame of one of the film strip 25 is aligned properly with the axis of the lamp 26 and lens 28.

A manual operating element 35 by which the body 31 may be shifted longitudinally of the rods 29 is formed integrally with the frontmost one of the enlargements 31a of the body 31 and extends upwardly and forwardly to project outwardly through a suitable horizontally extending slot 36 formed in the front wall 14e of the cabinet 14. Above the slot 36 the front wall 14e is sloped upwardly and rearwardly, and all but the marginal portion of this sloping part of the front wall 14e is removed to provide a viewing aperture. A screen 37 preferably formed of translucent sheet material is associated with the sloping portion of the front wall 14e to extend thereacross. An enlarged image of miniature indicia on a selected frame of one of the film strips 25 will be projected by the lens unit 28 and will be reproduced on the translucent screen 37 to be viewed by a person viewing the outer side of the screen 37. To assist in properly positioning the manually operating element 35 so that proper alignment with a selected one of the film strips 25 will be obtained a pointed projection 35a is provided on the lower and forward side of the element 35 near the inner side of the front wall 13e. A member 39 of triangular cross sectional shape is suitably secured to the inner side of the front wall 14e to extend parallel to the horizontal slot 36 and to be engaged on an upwardly and inwardly facing surface thereof by the pointed projection 35a. To receive the pointed projection 35a the member 39 is provided with a series of notches 39a in the upwardly and rearwardly facing surface thereof, these notches being so situated that the pointed element 35a will be engaged in one thereof when the common axis of the lamp 26 and lens unit 28 is properly aligned with one of the film strips 25. As indicated in Fig. 1, reference letters, such as the letters A to H inclusive, may be placed on the front side of the front wall 14e immediately below the slot 36 and in alignment with the respective ones of the notches 39a. To facilitate positioning of the transparent tubular element 15 in a selected rotated position thereof the knob 20 may, as indicated in Figs 1 and 2, be made with a polygonal peripheral shape, and the respective faces of the periphery of the knob 20 may be, as indicated in Fig. 1, provided with numerals identifying the respective positions of the knob 20.

Referring to Figs. 4 to 11 inclusive a form of our device is shown which is generally similar to that described above but which is provided with push button controlled automatic electrically operated position seeking equipment for adjustively shifting the lamp and lens unit and adjustively rotating the cylindrical indicia bearing structure. A device shown in Figs. 4 to 11 includes a cabinet 40 generally similar to the cabinet 14a described above and having a front wall 40e, the upper portion of which slopes upwardly and rearwardly and is provided in the same manner as the previously described cabinet with a translucent screen 41 similar to the previously described screen. Within the cabinet 40 we provide a rotatable generally cylindrical structure having at its right-hand end a relatively heavy wheel or disc 42 on the marginal portion of which is a flange 42a extending axially to the left. Formed integrally with the flange 42a we provide a circumferentially extending series of circumferentially spaced axially extending bars 42b. Formed integrally with the free ends of the respective bars 42b is a ring 42c. The wheel 42 is provided at its axis with a shaft 43 having a squared portion 43a extending through a centrally located square aperture in the wheel 42. Immediately to the right of the wheel 42 the shaft 43 is provided with an integral flange 43b. A portion 43c of the shaft to the left of the wheel 42 is screw threaded and carries thereon a nut 44 drawn up tightly against the left-hand face of the wheel 42. A portion 43d of the shaft 43 is of shorter cross section and constitutes a pivot. Secured to the floor 40b of the cabinet 40 by suitable means such as bolts 45 is an upstanding bracket 46 having a bossed and apertured portion 46a in which the pivot 43d is journalled. A second bracket 47 secured to the floor 40b of the cabinet 40 by suitable means such as bolts 48 is formed in its upper portion into a ring 47a of angular cross sectional shape including an annular flange 47b comprising a pivot on which the internal periphery of the ring 42c runs.

For use with the above described generally cylindrical structure comprising the portions 42, 42a, 42b and 42c we provide indicia bearing means consisting of a plurality of strips 49 of light transmissive material. On each strip 49 we provide a longitudinal series of rectangular sheets 50 of film or emulsion in which the desired respective groups of indicia are formed. These strips 49 are carried by the generally cylindrical structure in the spaces between the bars 42b and are each disposed in a position preferably normal to lines radiating from the axis of the cylindrical structure. To receive the right-hand ends of the strips 49 the flange 42a is provided in its free end portion with leftwardly opening recesses 42d. To receive the left-hand ends of the strips 49 the ring 42c is provided with apertures 42e extending in an axial direction therethrough. The recesses 42d and the apertures 42e are of such dimensions as to relatively snugly receive the strips 49. The strips 49 are inserted from a point at the left of the ring 42c through the apertures 42e and are moved to the right until their right-hand ends are in the recesses 42d. The ring 42c is provided with set screws 51 for securing the strips 49 in their intended position. To enable insertion of the strips 49 in the manner just described the bracket 47 is provided with one or more suitably positioned and dimensioned apertures 47c.

As in the previously described form of our apparatus we provide a light source such as the lamp 52 within the interior space of the cylindrical member, this lamp 52 being provided with a socket 52a and a casing 52b. The casing 52b is provided with an aperture 52c in such position as to permit rays from the lamp 52 to pass radially outwardly relative to the generally cylindrical structure. Outwardly of the cylindrical structure we provide a lens unit 53 having an axis common with the axis of the light beam projected by the lamp 52. We provide means for supporting the lamp 52 and lens unit 53 and enabling movement of the same in unison in a direction parallel to the axis of the cylindrical structure. In providing such support we attach to the floor 40b of the cabinet 40 a block 54 of material extending in a direction parallel to the axis of the cylindrical structure and having therein an upwardly opening, relatively deep slot 54a which divides the block 54 in its medial and upper portions into a front upstanding portion 54b and a rear upstanding portion 54c. In the upper portions thereof the front and rear upstanding portions 54b and 54c of the block 54 are provided with mutually facing grooves 54d on the respective inner sides thereof constituting guideways for a sliding member or carriage. A relatively long sliding member or carriage 55 is provided with integral longitudinally extending sidewardly projecting flanges 55a running in the respective grooves 54d. It should be apparent that the direction of movement of the carriage 55 will be parallel to the axis of the generally cylindrical structure. As shown in Fig. 6, a bracket 56 is secured by suitable means, such as the screws 56f, to the left-hand end of the carriage 55. This bracket extends a moderate distance to the left and then is bent rearwardly. The rearwardly bent portion 56a of the bracket carries respective extensions 56b and 56c extending to the right and rigidly carrying at their respective free ends the lens unit 53 and the lamp 52. To facilitate extension of electrical wires to the lamp 52 the bracket 56 may be formed of tubular material and may have an aperture 56d therein for accommodating electrical wires 56e running to the lamp socket 52a.

The lower side of the carriage 55 is provided throughout its length with rack teeth 55c and a gear 57c meshed with the rack teeth 55c is carried on a pivot 58 carried in suitably apertured portions of the central parts of the front and rear upstanding portions 54b and 54c of the block 54. An electric motor 57 is arranged with its shaft 57a projecting through suitable apertured portions of the upstanding elements 54b and 54c and therebetween carrying a pinion 57b meshed with the gear 57c. Operation of the motor will obviously cause longitudinal movement of the carriage 55. For control of the motor 57 in a manner to be later described a strip of electrical insulating material 59 extends along and is suitably secured to the upper face of the carriage 55. On top of the insulating material 59 a pair of electrical conductive strips 60 and 61 are provided. The strips 60 and 61 each extend through slightly less than half the length of the carriage 55 and a piece of insulating material 62 is placed between mutually facing ends of the respective strips 60 and 61, the tops of the strips 60 and 61 and of the piece of insulating material 62 being flush with each other. Above the conductive strips 60 and 61 the front upstanding portion 54b of the block 54 is provided with a rearwardly projecting longitudinally extending flange 54e which has therealong a longitudinally extending series of longitudinally spaced vertical apertures 54f, each of which is bushed with a tubular electrical insulating element 63. Working in each of the tubular insulating elements 63 is an electrical brush 64 pressed downwardly into engagement with the upper surface of the track formed by the conductive elements 60 and 61 and the insulating element 62 by a spring 65 which has a base insulated from the element 54b by an insulating member 66 and secured thereto by means of a screw 67. The rear one of the flanges 55a of the carriage 55 is provided with notches 55b. The central portion of the rear upstanding portion 54c is vertically apertured and this apertured portion contains a vertically slidable plunger 68 carrying a roller 69 for engagement with the notches 55b. A cap 70 is secured in the upper portion of the aperture in the upstanding element 54c and contains a compression spring 71 bearing downwardly on the plunger 68. The notches 55b are so situated along the length of the flange 55a that the roller 69 will be engaged in one of the notches 55b when the lamp 52 and lens unit 53 are aligned with any one of the circumferentially extending rows of indicia bearing portions 50 of the light transmissive strips 49. Push button controlled automatic electrically operated position seeking equipment of which the strips 60 and 61, the brushes 64 and the motor 57 constitute a part will be later described.

Referring again to the rotatably supported generally cylindrical structure in which the indicia bearing strips 49 are carried, an electric motor 72 is provided for producing rotation thereof. The shaft 72a of the motor carries a pinion 72b meshed with gear teeth 42f formed on the periphery of the wheel 42. The right-hand portion of the flange 42a is provided in one part of its periphery with an insert 73 of insulating material, the outer surface of the insert 73 being flush with the smooth circular periphery of the right-hand portion of the flange 42a. Encircling the right-hand half of the flange 42a is an annular brush supporting member 74 having feet 74a secured to the floor 40b of the cabinet 40 by suitable means, such as the bolts 75. At points equally separated around the circumference of the member 74 tubular insulating elements 76 are secured in radially apertured portions of the brush supporting member 74. Each of the tubular insulating elements 76 constitutes a guide and contains therewithin an electrical brush 77 bearing radially inwardly against the periphery of the right-hand portion of the flange 42a. Springs 78 press the brushes 77 inwardly and are attached at their bases to the member 74 by means such as the screws 79 and are separated electrically from the member 74 by insulating elements 80. Push button controlled automatic electrically actuated position seeking means of which the motor 72, the insulation insert 73, and the brushes 76 constitute a part will be later described. For establishing a dependable electrical connection between the wheel 42 and the bracket 46 a spring 81 is provided bearing against the end of the pivot 43d and secured to the bracket 46 by suitable means such as the screw 8a.

The left-hand portion of the flange 42a is provided with a series of axial notches 42g spaced circumferentially thereabout. Attached to the upper portion of the brush supporting member 74 is a vertical guide member 83 containing a plunger 84 which carries on its lower end a roller 85 for engagement in the notches 42g. Above the plunger 85 a compression spring 86 is confined within the guide 83 to press the plunger 84 downwardly. The notches 42g are so situated on the flange 42a that the roller 85 will be disposed in one of the notches 42g when any one of the respective strips 49 is properly aligned with the lamp 52 and the lens unit 53.

Referring to Fig. 12 we show therein the electrical connections involved in the automatic push button controlled electrically actuated position finding equipment of the apparatus shown in Figs. 4 and 6 to 11 inclusive. As shown in Fig. 4, we provide a plurality of electrical push buttons 87, each of which has contacts equivalent to three stationary contacts 87a, 87b and 87c, all engageable by a common moving electrical contact member 87d which is pushed toward the stationary contacts by pressure on the external finger piece 87e of the push button. We provide a battery 88 of which the positive terminal indicated by a plus sign is connected through a branching wire 89 to the center stationary contacts 87b of each and every one of the twenty-five electrical push buttons 87 shown in Fig. 12. It should be apparent then that operation of any one of the push buttons 87 will result in the positive terminal of the battery 88 being connected to the remaining two stationary contact elements 87a and 87b. In the top row of push buttons 87 the left-hand stationary contacts 87a of all of the buttons in that row are connected through a wire 90 to one of the brushes 77 working on the periphery of the wheel 42 associated with the rotatable generally cylindrical indicia carrying structure. Similarly the left-hand stationary contact elements 87a of the next lower row of push buttons contacts are all connected through a wire 91 to another of the brushes 77. Following the same scheme wires 92, 93 and 94 connect all of the left-hand push button contacts 87a in the third, fourth and fifth rows respectively to respective remaining ones of the brushes 77. The wheel 42 is connected through a wire 95 to one terminal 96 of the motor 72 and the remaining terminal 97 of the motor 72 is connected through a wire 98 to the negative terminal of the battery 88 which is indicated by a minus sign. If a push button in one of the horizontal rows is pressed, current from the battery will flow through the contacts 87b and 87a of that push button and continue through one of the wires 90 to 93 inclusive to one of the brushes 77. From that brush 77 the current will flow through the wheel 42a and the wire 95 to the motor 72, through the motor 72 and into the negative terminal of the battery 88 through the wire 98. This will cause the motor to rotate and rotation of the motor will continue until the block 73 of insulating material in the periphery of the wheel 42 reaches a position under the one of the brushes 77 through which the current has been delivered to the motor 72. Alignment of the insulating block 73 with the one of the brushes 77 through which current has been delivered to the motor 72 will cause interruption in the flow of current to the motor. The spring pressed roller 85 will force itself into one of the notches 42b into which it has at least partially entered and will cooperate with the inclined planes defining the notch to accurately position the wheel 42 so that one of the light transmissive indicia bearing strips 49 will be accurately aligned with the lamp 52 and lens 53. It should be seen that pressing any one of the buttons in the top horizontal row of push buttons will cause the wheel 42 to be rotated to the position thereof in which it is shown in Fig. 13. Operation of any button in the second row will cause rotation of the wheel 42 to another position, and, likewise, operation of buttons in any one of the remaining rows of push buttons will cause the wheel 42 to be positioned in one of its remaining positions.

The right-hand stationary contacts 87c of the left-hand vertical row of push buttons are all connected through a wire 99 to next to the right-hand end one of the brushes 64 associated with the carriage 55. All of the right-hand stationary contact elements 87c of the second vertical row of push buttons 87 are connected through a wire 100 to the next brush to the left of the one just mentioned. Similarly the right-hand stationary contacts 87c of the third, fourth and fifth vertical rows of buttons are connected through respective wires 101, 102, and 103 to other of the brushes 64. The motor 57 has one commutator brush 57d connected through a wire 104 to the negative terminal of the battery 88. The remaining commutator brush 57e of the motor 57 is connected to the midpoint of a center tapped field winding 57f comprising part of the motor 57. The motor 57 being equipped with a center tapped field coil is a reversible motor and its direction of rotation will depend upon which half of the field winding 57f is connected in circuit with the commutator brushes 57d and 57e. The end terminals 57g of the field winding 57f are connected through wires 105 and 106 to the respective endmost ones of the brushes 64. These endmost ones of the brushes 64 constitute terminals into which current from the positive terminal of the battery 88 may be fed to the motor 57. When one of the push buttons in one of the vertical rows thereof is operated the positive terminal of the battery 88 will be connected through the push button and one of the wires 99 to 103 inclusive to one of the intermediate brushes 64. The brush thus energized will be in contact with one or the other of the conductive strips 60 and 61 dependent upon the position of the carriage 55. For example, as one of the brushes 64 to the right of the insulation insert 62 is energized, current therefrom will feed through the right-hand strip 61 and the right-hand brush 64 to the upper terminal of the field winding 57f whereby the upper half of the field winding 57f will be in operation to cause rotation of the motor 57 in one direction. This rotation of the motor will be in such direction as to cause movement of the carriage 55 to the right and this movement will continue until the insulation insert 62 arrives under the energized brush 64 to interrupt the motor circuit and thus cause the motor to stop. At this time the roller 69 will cooperate with one of the notches 55b on the carriage flange 55a to cause accurate positioning of the carriage 55 so that the axis of the lamp 52 and the lens 53 will be accurately aligned with a selected one of the circumferentially extending rows of indicia bearing sheets 50. If the energized one of the brushes 64 had been to the left of the insulation insert 62 the lower half of the field winding 57f would have been brought into action to cause the motor to move the carriage 55 to the left until the insulation insert 62 had reached a position under the energized brush. From the above it should be seen that operation of any of the push buttons in the left-hand vertical row thereof will cause the motor 57 to shift the carriage 55 to a point where the insulation insert 62 is below the next to the right-hand end one of the brushes 64. Similarly, operation of any of the push buttons in the second vertical row thereof will cause the carriage 55 to assume another one of its respective positions. Other positions of the carriage 55 will be arrived at by operation of buttons in the other remaining vertical rows thereof.

It should be apparent that pressing of one of the buttons 87 will operate both of the motors 57 and 72 to cause adjustive shifting of the carriage 55 and adjustive rotation of the wheel 42. Thus only one push button need be pressed to align any one of the indicia bearing sheets 50 with the axis of the lamp 52 and lens 53. For purposes of simplicity, we have shown a control system involving only five longitudinally spaced positions and five rotationally obtained positions. With the system described this involves twenty-five push buttons as shown in Fig. 12. Referring to Fig. 9, it will be seen that only five strips 49 are provided on the rotatable cylindrical structure whereas, as indicated in dotted lines, additional strips 49 could be provided. As should be apparent the system shown in Fig. 12 would be accordingly extended to accommodate the additional positions of indicia bearing sheets 50. The system of Fig. 12 is useful where the number of indicia bearing sheets is not too great and affords the advantage that only one button need be pressed to cause production on the screen 41 of any desired one of the available indicia bearing sheets 50.

Where a larger number of indicia bearing sheets are provided the number of push buttons would become excessive and accordingly we provide, as indicated in Fig. 13, an alternative control button arrangement, wherein the left-hand row of push buttons 107 control only the rotational positioning equipment and are arranged to connect the positive terminal of the battery 88 to respective ones of the wires 91 to 94 inclusive. The right-hand vertical row of push buttons are arranged to control only adjustive positioning of the carriage 55 and are connected to establish circuits from the battery 88 to the respective wires 99 to 103 inclusive. It is believed that operation of the push buttons 107 of Fig. 13 will be apparent from the preceding explanation of the operation of the circuits shown in Fig. 12. Fig. 5 of the drawings shows the front wall 40e of the cabinet 40 as it would appear equipped with the ten push buttons 107 shown in Fig. 13. While the arrangement of Fig. 13 provides for only five positions of the carriage 55 and five rotational positions of the generally cylindrical rotatable structure it should be apparent that this scheme could be readily extended to provide for many more positions without involving a cumbersome number of push buttons 107.

While we have described the apparatus shown in the drawings as including a translucent screen 41 we are aware that this screen might well be omitted when desired and the projected image could then be projected on a more distantly located screen similar to that employed in connection with stereopticon and motion picture equipment.

It should be apparent that we have invented a novel, selective indicating, and display device capable of rapid and easy operation to display any selected one of a large number of individual groups of indicia.

It will, of course, be understood that various changes may be made in the form, details, arrangement and proportions of the various parts without departing from the scope of our invention.

What is claimed is:

1. Display apparatus comprising, a generally cylindrical hollow member, a plurality of indicia-bearing sheets of light-transmissive material of respectively similar dimensions carried by said member and arranged thereon in a circumferentially extending series of axially extending rows thereof, an outwardly directed light source within said member and a lens outside said member disposed on a common axis for projection of an image of the indicia on one of said sheets outwardly through said lens, a structure rigidly carrying said light source and said lens and being adjustively movable longitudinally of said member means for selectively moving said structure for aligning and maintaining said axis with any selected one of the respective circumferentially extending rows of said sheets, said member being adjustively rotatable for aligning any selected one of the respective axially extending rows of said sheets with said axis, selectively operated means for effecting desired rotation to make said desired alignment and an image-receiving screen situated outwardly of said member from said lens.

2. Display apparatus comprising, a generally cylindrical hollow member, a plurality of indicia-bearing sheets of light-transmissive material of respectively similar dimensions carried by said member and arranged thereon in a circumferentially extending series of axially extending rows thereof, an outwardly directed light source within said member and a lens outside said member disposed on a common axis for projection of an image of the indicia on one of said sheets outwardly through said lens, a structure rigidly carrying said light source and said lens and being adjustively movable longitudinally of said member, means for selectively moving said structure in both directions for aligning said axis with any selected one of the respective circumferentially extending rows of said sheets, said member being adjustively rotatable for aligning any selected one of the respective axially extending rows of said sheets with said axis, means for selectively rotating said member for effecting any of said desired alignments and a translucent image-receiving screen situated outwardly of said member from said lens.

3. Display apparatus comprising, a generally cylindrical hollow member, a plurality of sheets of light-transmissive material of respectively similar dimensions bearing miniature indicia on various ones thereof, said sheets being carried by said member and arranged thereon in a circumferentially extending series of axially extending rows thereof, an outwardly directed light source within said member and a light ray diverging lens disposed outwardly of said member on a common axis with said light source for outwardly projecting and magnifying the indicia of one of said sheets, a structure rigidly carrying said light source and said lens and being adjustively movable axially of said member means for selectively moving said member in both directions for aligning said axis with any selected one of the respective circumferentially extending rows of said sheets, said member being adjustively rotatable for aligning any selected one of the respective axially extending rows of said sheets with said axis, means for selectively controlling the rotation of said member in clockwise and counter-clockwise direction and an image-receiving screen situated outwardly of said member to receive a magnified image projected by light from said source.

4. Display apparatus comprising, a cabinet, a generally cylindrical hollow member within said cabinet, a plurality of indicia-bearing sheets of light transmissive material of respectively similar dimensions carried by said member and arranged thereon in a circumferentially extending series of axially extending rows thereof, an outwardly directed light source within said member for projecting an image of the indicia on one of said sheets outwardly, a carriage mounted within said cabinet for adjustive movement in a path parallel to the axis of said member and including a projecting portion on which said light source is rigidly mounted whereby said light source may be aligned with any selected one of the respective circumferentially extending rows of said sheet, a selective manual operating element for said carriage extending to a point outside of said cabinet, said member being adjustively rotatable for aligning any selected one of the respective axially extending rows of said sheets with said light source, a selective manual operating element for said member extending to a point outside of said cabinet in proximity to the first mentioned operating element, said cabinet having an opening therein situated outwardly of the various adjusted positions of said light source and closely adjacent the said operating elements, and an image-receiving screen extending across said opening.

5. A display device, comprising a generally cylindrical hollow member, a plurality of indicia-bearing sheets of light-transmissive material of respectively similar dimensions carried by said member and arranged thereon in a circumferentially extending series of axially extending rows thereof, a carriage mounted beside said member for adjustive movement in a direction parallel to the axis of said member, one end of said member being open, an arm carried by said carriage extending into the interior space of said member through the open end thereof, a light source carried on said arm within said member and directed generally radially outwardly thereof for projecting an image of the indicia on one of said sheets outwardly, alignment of said light source with any selected one of the respective circumferentially extending rows of said sheets being effected by adjustive movement of said carriage, means for selectively effecting such adjustments said member being mounted for adjustive rotation thereof to align any selected one of the respective axially extending rows of said sheets with said light source, means for selectively effecting said adjustive rotation and an image-receiving screen situated outwardly of said member to receive an image projected by light from said light source.

6. The combination defined in claim 5 and a lens supported from said carriage and disposed outwardly of said light source on a common axis therewith to direct light rays therefrom.

7. The combination defined in claim 5 and a lens supported from said carriage disposed between said member and said screen on a common axis with said light source to direct light rays therefrom onto said screen.

8. Display apparatus comprising, a generally cylindrical hollow member, means for mounting said member for oscillation, a plurality of indicia-bearing sheets of light-transmissive material of respectively similar dimensions carried by said member and arranged thereon in a circumferentially extending series of axially extending rows thereof, an outwardly directed light source within said member and a lens outside of said member disposed on a common axis with said light source for projection of an image of the indicia of one of said sheets outwardly through said lens, a structure rigidly carrying said light source and said lens, means for mounting said structure and said cylindrical member for relative longitudinal movement in both directions, control means for producing selective relative movement of said members in both directions to instantly align and maintain said axis with any one of the respective circumferentially extending rows of sheets, control means for oscillating said cylindrical member selectively in both directions to align and maintain said axis with a longitudinal center of any desired axially extending rows of said sheets, and an image receiving screen situated outwardly of said member from said lens.

EARL E. BROWN.
ERNEST A. ANDERSON.
WILLIAM H. SCHAPER.